(12) United States Patent
Butler (10) Patent No.: US 9,208,600 B2
(45) Date of Patent: Dec. 8, 2015

(54) CUSTOM ANIMATION APPLICATION TOOLS AND TECHNIQUES

(71) Applicant: TRIGGER HAPPY, LTD., Auckland (NZ)

(72) Inventor: Karl Butler, Auckland (NZ)

(73) Assignee: TRIGGER HAPPY, LTD, Auckland (NZ)

( * ) Notice: Subject to any disclaimer, the term of this patent is extended or adjusted under 35 U.S.C. 154(b) by 140 days.

(21) Appl. No.: 13/785,976

(22) Filed: Mar. 5, 2013

(65) Prior Publication Data

US 2013/0229418 A1 Sep. 5, 2013

Related U.S. Application Data

(60) Provisional application No. 61/606,865, filed on Mar. 5, 2012.

(51) Int. Cl.
*G06T 15/00* (2011.01)
*G06T 13/80* (2011.01)
*G06T 11/60* (2006.01)
*G06T 13/40* (2011.01)
*G06T 11/00* (2006.01)

(52) U.S. Cl.
CPC .............. *G06T 13/80* (2013.01); *G06T 11/00* (2013.01); *G06T 11/60* (2013.01); *G06T 13/40* (2013.01)

(58) Field of Classification Search
CPC ......... G06T 11/60; G06T 11/00; G06T 13/80; G06T 13/40
USPC .......................................... 345/473, 474, 475
See application file for complete search history.

(56) References Cited

U.S. PATENT DOCUMENTS

| 6,144,385 | A | 11/2000 | Girard |
| 6,522,331 | B1 | 2/2003 | Danks |
| 7,378,812 | B2 * | 5/2008 | Yamamoto et al. ...... 318/568.12 |
| 7,515,155 | B2 | 4/2009 | Anderson et al. |
| 8,094,156 | B2 * | 1/2012 | Smith ............................ 345/473 |
| 8,194,082 | B2 * | 6/2012 | Smith ............................ 345/473 |
| 8,243,078 | B2 * | 8/2012 | Perlin ............................ 345/473 |
| 8,508,537 | B2 * | 8/2013 | Collard et al. ................. 345/474 |

* cited by examiner

*Primary Examiner* — Phu K Nguyen
(74) *Attorney, Agent, or Firm* — Marger Johnson (57) ABSTRACT

A machine-controlled method can include an electronic device display visually presenting to a user a digital character, multiple vector cutters positioned over corresponding portions of the digital character, and at least one joint option feature positioned within overlapping sub-portions of at least two vector cutters. The method can also include the display visually presenting a movement of the digital character based on the vector cutters and joint option feature.

20 Claims, 7 Drawing Sheets

CUSTOM ANIMATION APPLICATION TOOLS AND TECHNIQUES

CROSS-REFERENCE TO RELATED APPLICATION

This application claims the benefit of U.S. Provisional Patent Application No. 61/606,865, titled "CUSTOM ANIMATION APPLICATION TOOLS AND TECHNIQUES" and filed on Mar. 5, 2012, which is hereby incorporated herein by reference in its entirety.

TECHNICAL FIELD

The disclosed technology pertains to tools and techniques for generating and managing tile profiles in connection with social media technologies.

BACKGROUND

Custom animation software has gained significantly popularity over the years. Such popularity, coupled with the continuing advances in personal electronic equipment, particularly handheld devices such as tablet computers and smartphones, has resulted in an increasing demand for powerful and flexible custom animation software that may be used on or by a number of different electronic devices. Current custom animation software, however, still tends to leave certain users with a desire for more creative ways to manipulate characters, particularly predetermined or predefined characters.

Thus, there remains a need for a way to address these and other problems associated with the prior art.

DETAILED DESCRIPTION

Embodiments of the disclosed technology generally pertain to a variety of custom animation tools and techniques that may be executed, performed, and controlled on a computing device such as an Apple® iPhone device, iPad device, or iPod Touch device, or any smartphone, tablet computing device, portable media device, or other type of personal computing device, handheld or otherwise.

Figure 1:
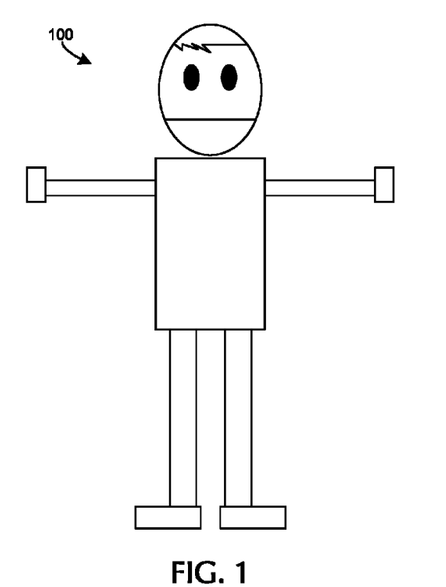
FIG. 1 illustrates an example of a character displayed on a screen or other type of display of an electronic device in accordance with certain embodiments of the disclosed technology.

FIG. 1 illustrates an example of a character 100 displayed on a screen or other type of display of an electronic device in accordance with certain embodiments of the disclosed technology. The displayed character 100 may be selected from a library of pre-made characters or it may be imported from an external application or data store. In alternative embodiments, the character 100 may be created by the user prior to the performing of any of the following functionality thereon.

Figure 2:
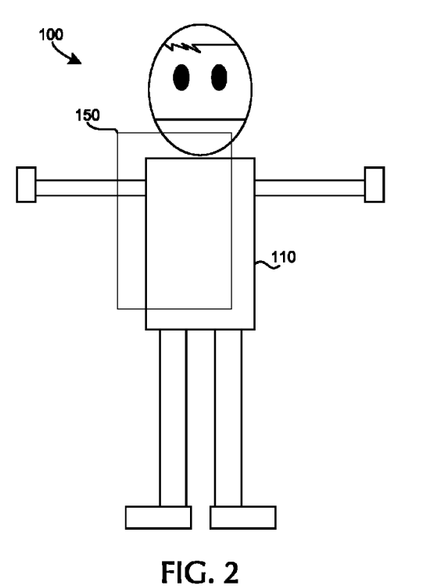
FIG. 2 illustrates an example of a vector cutter in accordance with certain embodiments of the disclosed technology.

FIG. 2 illustrates an example of a vector cutter 150 in accordance with certain embodiments of the disclosed technology. A user may instantiate the vector cutter 150 by tapping or double-tapping the screen on, next to, or within the general vicinity of the character 100, for example. In certain embodiments, the user may select the vector cutter 150 from a set of predetermined vector cutters, e.g., from a vector cutter library. Alternatively, the vector cutter 150 may be instantiated as a particular shape, e.g., circular, rectangular, or square. In certain embodiments, the user may "draw" the vector cutter 150. The user may adjust the size and/or shape of the vector cutter 150 by way of pinching, swiping, or other types of gestures using his or her fingers, for example. In the example, the user has made the vector cutter 150 to have approximately the same shape as, and have a size slightly larger than that of, the torso 110 of the displayed character 100.

Figure 3:
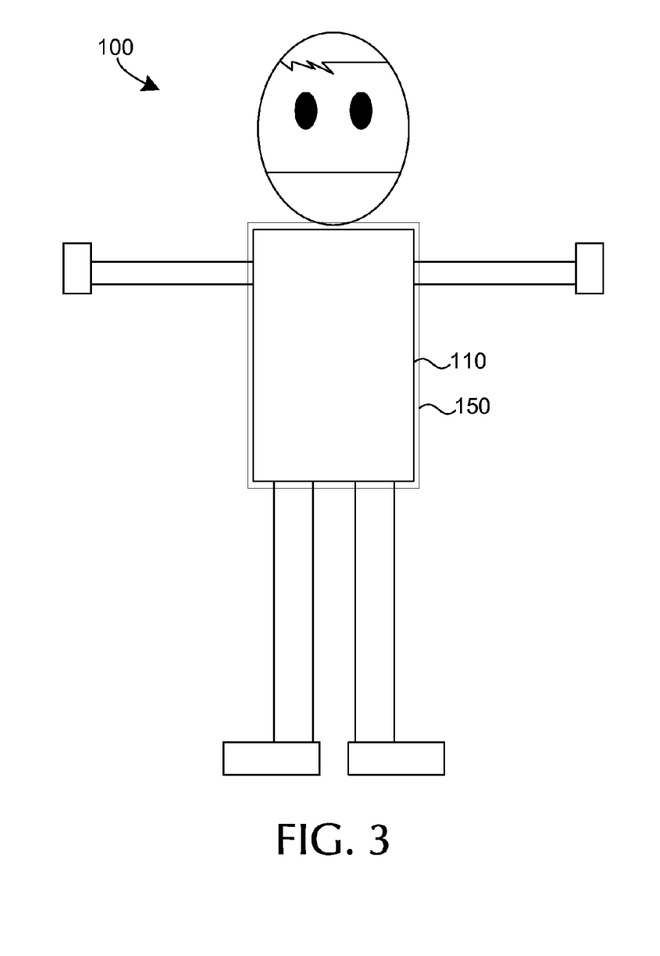
FIG. 3 illustrates an example of a user positioning the vector cutter illustrated by FIG. 2 over the desired portion of the displayed character in accordance with certain embodiments of the disclosed technology.

Once the user is satisfied with the size and shape of the vector cutter 150, he or she may position the vector cutter 150 over the desired portion of the displayed character 100, e.g., the torso 110 as illustrated in FIG. 3. The user may position the vector cutter 150 by using a touch-and-swipe gesture, for example. Alternatively, the user may perform another operation such as tapping or double-tapping the vector cutter 150 and then tapping or double-tapping the desired destination, e.g., the torso 110.

Figure 4:
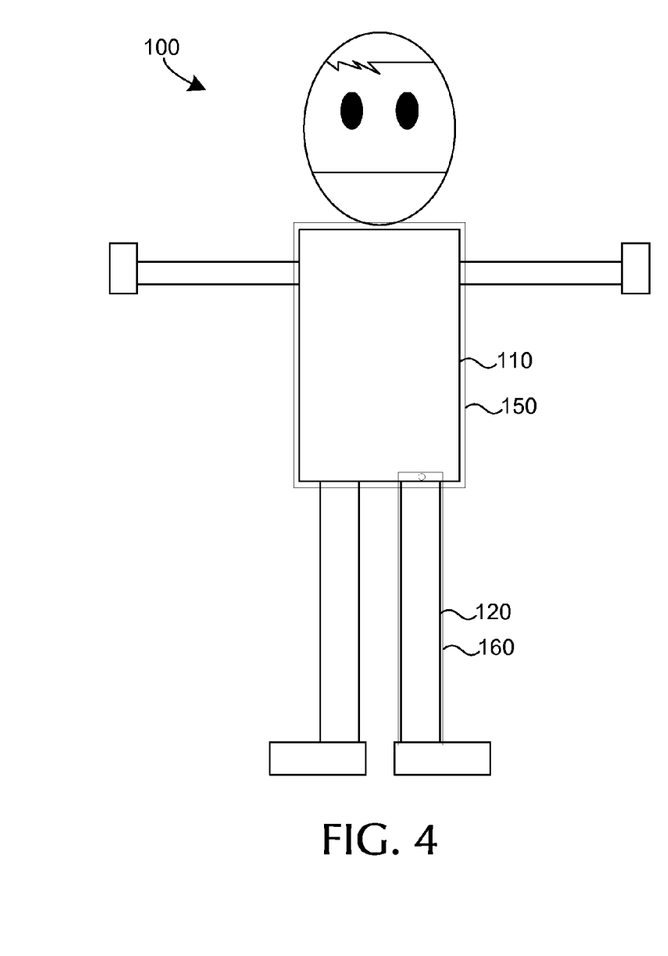
FIG. 4 illustrates an example of a joint option feature in accordance with certain embodiments of the disclosed technology.
Figure 5:
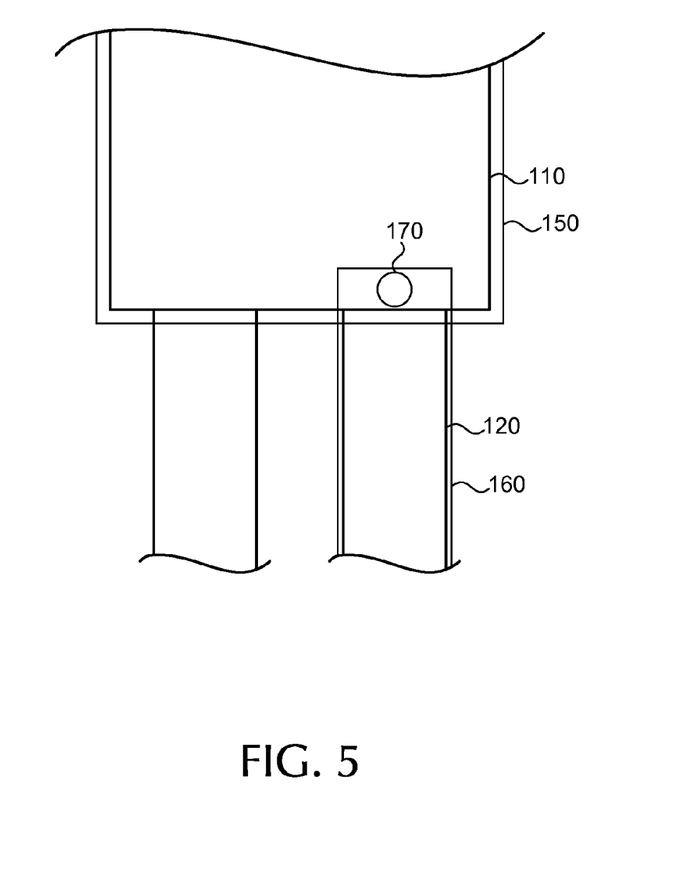
FIG. 5 illustrates a closer view of the joint option feature illustrated by FIG. 4 in accordance with certain embodiments of the disclosed technology.

FIGS. 4 and 5 illustrate an example of a joint option feature 170 in accordance with certain embodiments of the disclosed technology. In certain embodiments, a joint option feature may be automatically presented to the user whenever he or she positions a vector cutter such that it partially overlaps another vector cutter. Here, the joint option feature 170 is presented to the user responsive to the user positioning a second vector cutter 160 over the left leg 120 of the displayed character 100 such that the second vector cutter 160 partially overlaps the original vector cutter 150 that is positioned over the torso 110 of the displayed character 100.

In the illustrated example, the joint option feature 170 is a small red circle positioned in the middle of the overlap area. In alternative embodiments, the joint option feature 170 may have a different shape, color, and/or size and may be positioned elsewhere, e.g., closer to the edge of one of the vector cutters 150 and 160. In certain embodiments, the joint option feature 170 will not be automatically presented whenever two vector cutters overlap. In these embodiments, the joint option feature 170 may not be presented unless specifically requested by the user, e.g., as indicated by a tapping or double-tapping event by the user in the overlap area.

Figure 6:
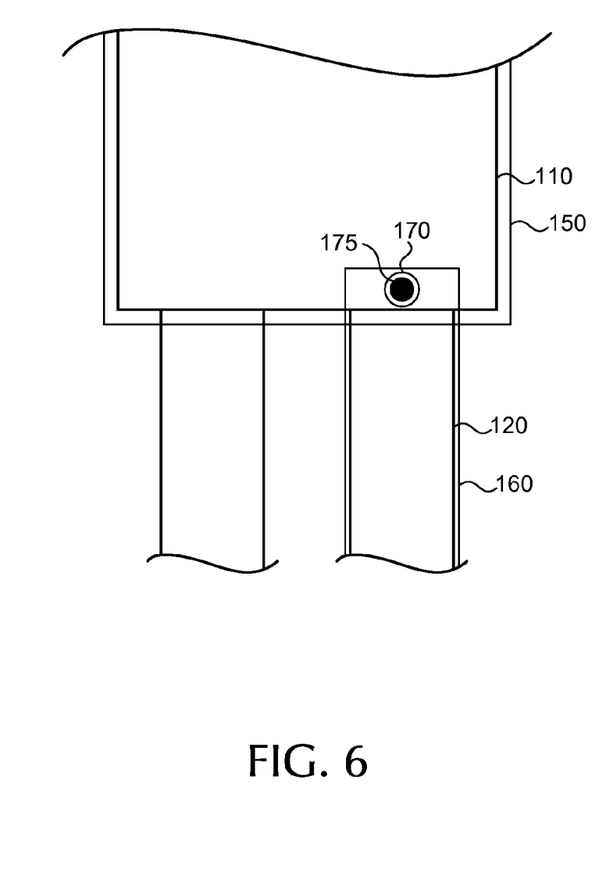
FIG. 6 illustrates an example of establishing a fixed joint within the joint option feature illustrated by FIGS. 4 and 5 in accordance with certain embodiments of the disclosed technology.

FIG. 6 illustrates the establishment of a fixed joint 175 within the joint option feature 170 illustrated by FIG. 5 in accordance with certain embodiments of the disclosed technology. This may be the result of an action by the user such as tapping or double-tapping the joint option feature 170. Alternatively, the fixed joint 175 may be automatically presented upon or subsequent to establishment of the joint option feature 170. In certain embodiments, the user may be prompted for a confirmation before the fixed joint 175 is established. Also, the user may remove the fixed joint 175 and/or the joint option feature 170 by a particular action such as tapping or double-tapping either or both of the fixed joint 175 and joint option feature 170.

Figure 7:
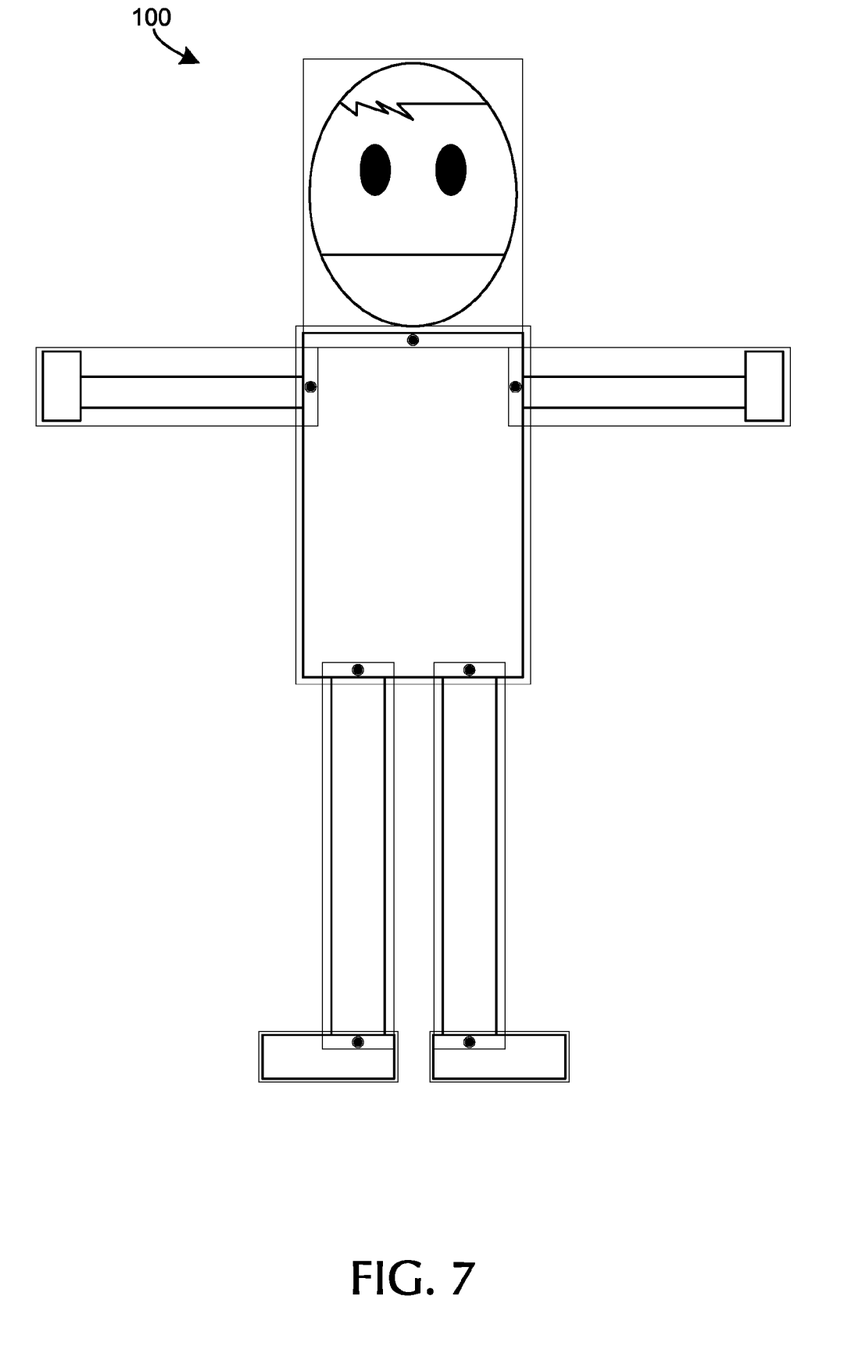
FIG. 7 illustrates an example in which a user has covered individual segments of a displayed character in accordance with certain embodiments of the disclosed technology.

The user may create and adjust enough vector cutters to substantially or completely cover the character 100. In the illustrated example, the user has covered each individual segment, e.g., head, torso, arms, legs, and feet, of the displayed character 100 as illustrated by FIG. 7. It should be noted that there is virtually no limit to the number of vector cutters that may be applied to the character 100. In certain embodiments, a hierarchy may be applied such that the first vector cutter 150 is considered the "parent" and each subsequent vector cutter connected thereto, e.g., the second vector cutter 160, is considered a "child" of the "parent." When a "parent" vector cutter moves, as described below, each "child" moves in accordance with the "parent."

Figure 8:
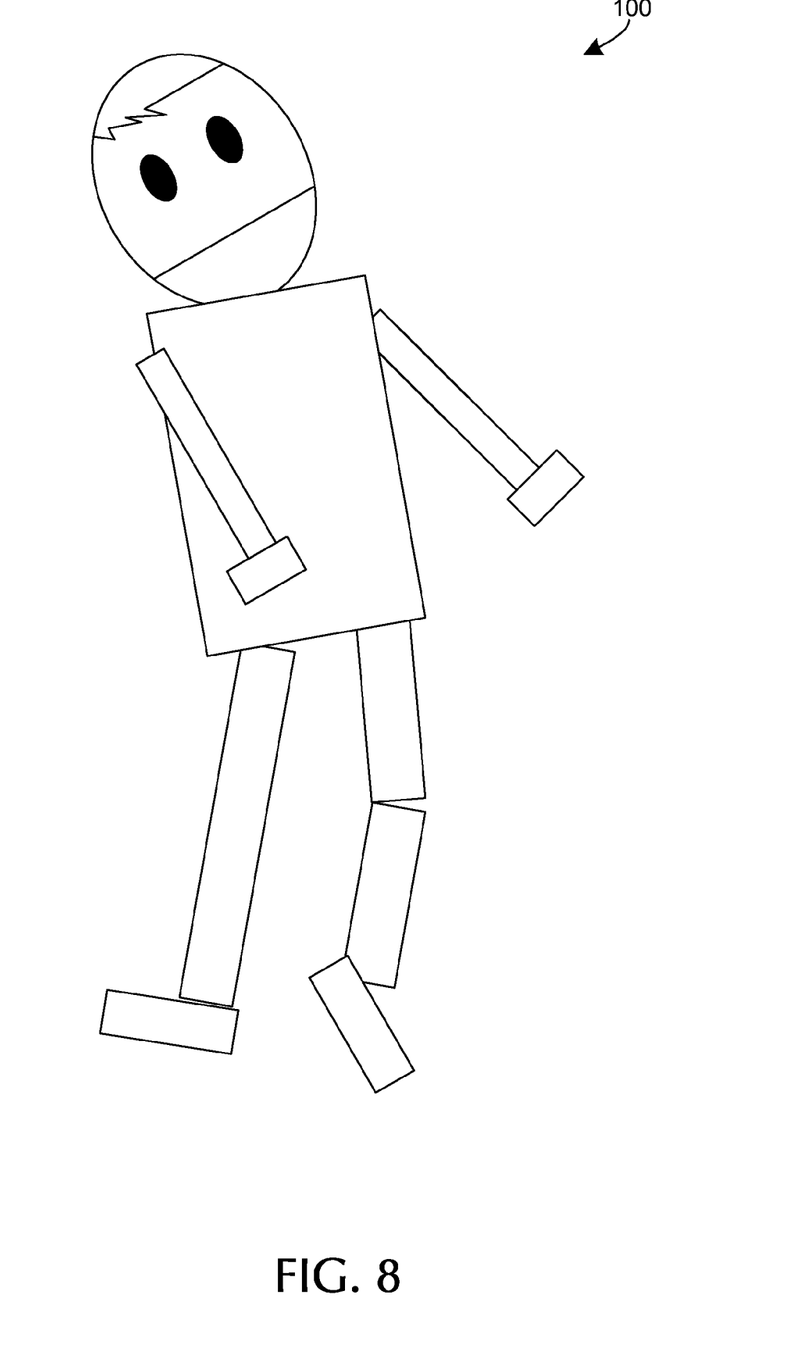
FIG. 8 illustrates a first example of a displayed movement of a character responsive to the user performing a particular action thereto in accordance with certain embodiments of the disclosed technology.
Figure 9:
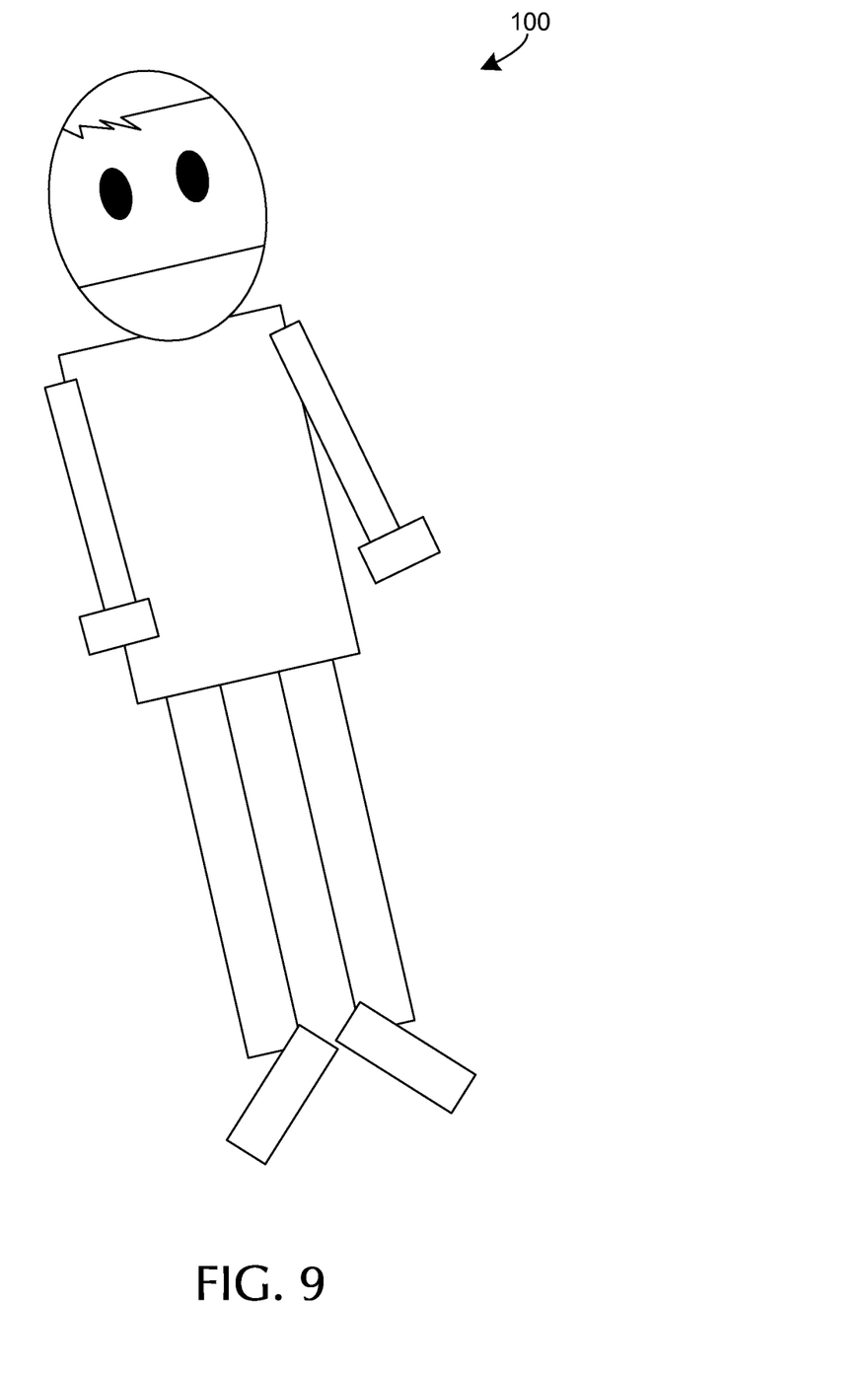
FIG. 9 illustrates a second example of a displayed movement of a character responsive to the user performing a particular action thereto in accordance with certain embodiments of the disclosed technology.

FIG. 8 illustrates a displayed movement of the character 100 responsive to the user performing a particular action thereto in accordance with certain embodiments of the disclosed technology. Here, the user has placed his or her finger on the head of the character 100 and slowly dragged it downward. By keeping his or her finger on the head of the character 100 and quickly dragging it up and to the left, the vector cutters cause the character 100 to "straighten" and move diagonally upward accordingly, as illustrated by FIG. 9.

In certain embodiments, controls may be provided to allow the user to record one or more actions of the character 100. The recorded action(s) may be played back subsequent to the recording thereof. For example, the user may select a "record" button, icon, etc. and then cause the character 100 to perform the desired actions. After the final action, the user may select a "stop" button, icon, etc. to stop the recording. Subsequently, the user may select a "play" button, icon, etc. to cause the device to display the recorded actions of the character 100. The recorded action(s) may be stored, shared with others, and/or re-used with other characters, e.g., other characters in a character library or characters in stored images or images uploaded by the user or another such as drawings, photographs, etc. In certain embodiments, a recording may be edited by a user. For example, a user may press the "play" button to start a recording and then press the "stop" button and/or an "edit" button to begin editing the recording at the present location, e.g., at a particular action, within the recording.

Figure 10:
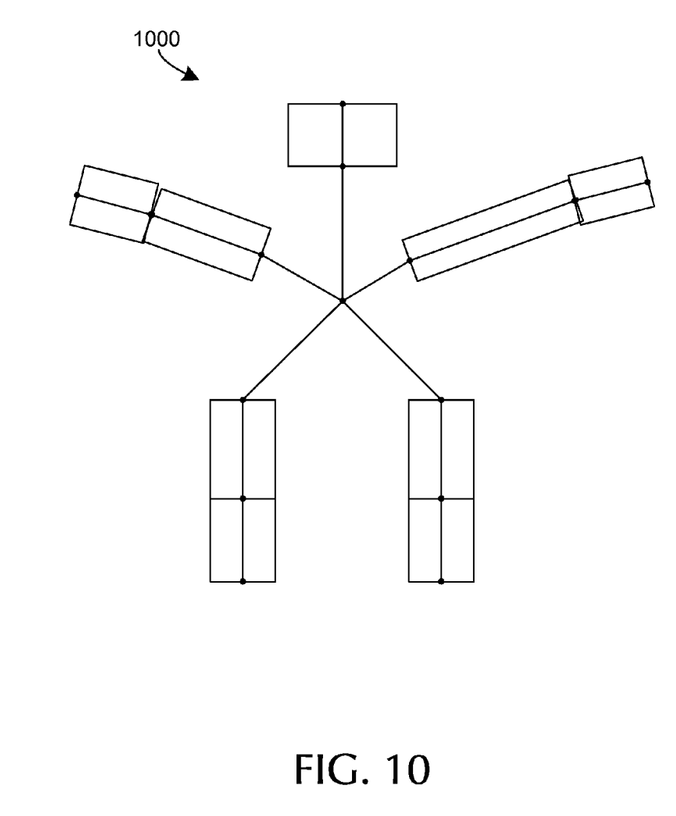
FIG. 10 illustrates a first example of a rig corresponding to a displayed character in accordance with certain embodiments of the disclosed technology.
Figure 11:
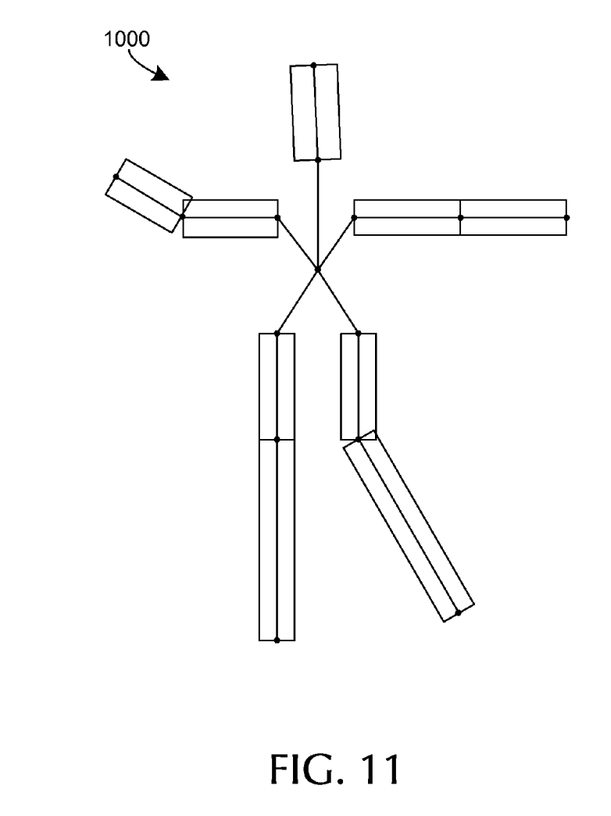
FIG. 11 illustrates a second example of a rig corresponding to a displayed character in accordance with certain embodiments of the disclosed technology.

FIGS. 10 and 11 illustrate an example of a "rig" 1000 corresponding to a displayed character, such as the displayed character 100 of FIGS. 1-9, in accordance with certain embodiments of the disclosed technology. In certain embodiments, once a user has finished applying vector cutters to a character, see, e.g., FIG. 7, the user may cause the system to save the arrangement of vector cutters as a "rig." Each "rig" may be applied to other characters such as may be identified in a character library or in stored images or images uploaded by the user or another such as drawings, photographs, etc. In certain embodiments, a "rig" may be edited in order to better fit another character, e.g., as identified in a character library. For example, a user may select a certain "rig" to be applied to a certain character, e.g., as selected by the user from a character library, and then alter the rig so that it better fits the selected character. The user may adjust any of a number of dimensional aspects or other characteristics of the "rig," such as size and shape, for example.

The following discussion is intended to provide a brief, general description of a suitable machine in which embodiments of the disclosed technology can be implemented. As used herein, the term "machine" is intended to broadly encompass a single machine or a system of communicatively coupled machines or devices operating together. Exemplary machines can include computing devices such as personal computers, workstations, servers, portable computers, handheld devices, tablet devices, communications devices such as cellular phones and smart phones, and the like. These machines may be implemented as part of a cloud computing arrangement.

Typically, a machine includes a system bus to which processors, memory (e.g., random access memory (RAM), read-only memory (ROM), and other state-preserving medium), storage devices, a video interface, and input/output interface ports can be attached. The machine can also include embedded controllers such as programmable or non-programmable logic devices or arrays, Application Specific Integrated Circuits, embedded computers, smart cards, and the like. The machine can be controlled, at least in part, by input from conventional input devices, e.g., keyboards, touch screens, mice, and audio devices such as a microphone, as well as by directives received from another machine, interaction with a virtual reality (VR) environment, biometric feedback, or other input signal.

The machine can utilize one or more connections to one or more remote machines, such as through a network interface, modem, or other communicative coupling. Machines can be interconnected by way of a physical and/or logical network, such as an intranet, the Internet, local area networks, wide area networks, etc. One having ordinary skill in the art will appreciate that network communication can utilize various wired and/or wireless short range or long range carriers and protocols, including radio frequency (RF), satellite, microwave, Institute of Electrical and Electronics Engineers (IEEE) 545.11, Bluetooth, optical, infrared, cable, laser, etc.

Embodiments of the disclosed technology can be described by reference to or in conjunction with associated data including functions, procedures, data structures, application programs, instructions, etc. that, when accessed by a machine, can result in the machine performing tasks or defining abstract data types or low-level hardware contexts. Associated data can be stored in, for example, volatile and/or non-volatile memory (e.g., RAM and ROM) or in other storage devices and their associated storage media, which can include hard-drives, floppy-disks, optical storage, tapes, flash memory, memory sticks, digital video disks, biological storage, and other tangible, non-transitory physical storage media. Certain outputs may be in any of a number of different output types such as audio or text-to-speech, for example.

Associated data can be delivered over transmission environments, including the physical and/or logical network, in the form of packets, serial data, parallel data, propagated signals, etc., and can be used in a compressed or encrypted format. Associated data can be used in a distributed environment, and stored locally and/or remotely for machine access.

Having described and illustrated the principles of the invention with reference to illustrated embodiments, it will be recognized that the illustrated embodiments may be modified in arrangement and detail without departing from such principles, and may be combined in any desired manner. And although the foregoing discussion has focused on particular embodiments, other configurations are contemplated. In particular, even though expressions such as "according to an embodiment of the invention" or the like are used herein, these phrases are meant to generally reference embodiment possibilities, and are not intended to limit the invention to particular embodiment configurations. As used herein, these terms may reference the same or different embodiments that are combinable into other embodiments.

Consequently, in view of the wide variety of permutations to the embodiments described herein, this detailed description and accompanying material is intended to be illustrative only, and should not be taken as limiting the scope of the invention. What is claimed as the invention, therefore, is all such modifications as may come within the scope and spirit of the following claims and equivalents thereto.

What is claimed is:

1. A machine-controlled method, comprising:
    a display of an electronic device visually presenting to a user a digital character;
    responsive to a first interaction between the user and the electronic device, the display visually presenting to the user a first vector cutter;
    responsive to a second interaction between the user and the electronic device, the display positioning the first vector cutter over a first specified portion of the digital character;
    responsive to a third interaction between the user and the electronic device, the display visually presenting to the user a second vector cutter;
    responsive to a fourth interaction between the user and the electronic device, the display positioning the second vector cutter over a second specified portion of the digital character;
    responsive to a fifth interaction between the user and the electronic device, the display visually presenting to the user a first joint option feature;
    responsive to a sixth interaction between the user and the electronic device, the display positioning the first joint option feature within a sub-portion of the first specified portion that overlaps a sub-portion of the second specified portion; and
    the display visually presenting a first movement of the digital character based at least in part on the first and second vector cutters and first joint option feature.

2. The machine-controlled method of claim 1, wherein the display is a touchscreen.

3. The machine-controlled method of claim 2, wherein either or both of the first and third interactions between the user and the electronic device comprises the user tapping or double-tapping the display on or near the digital character presented by the display.

4. The machine-controlled method of claim 3, wherein either or both of the first and third interactions between the user and the electronic device comprises the user tapping or double-tapping the display on or near the corresponding portion of the digital character.

5. The machine-controlled method of claim 3, wherein either or both of the second and fourth interactions between the user and the electronic device comprises the user adjusting the size, shape, or both of the corresponding vector cutter.

6. The machine-controlled method of claim 5, wherein the fifth interaction between the user and the electronic device comprises the user tapping or double-tapping the display at or near the sub-portion of the first specified portion that overlaps the sub-portion of the second specified portion.

7. The machine-controlled method of claim 1, wherein the first joint option feature comprises a small red circle.

8. The machine-controlled method of claim 1, further comprising:
    responsive to a seventh interaction between the user and the electronic device, the display visually presenting to the user a third vector cutter;
    responsive to an eighth interaction between the user and the electronic device, the display positioning the third vector cutter over a third specified portion of the digital character;
    responsive to a ninth interaction between the user and the electronic device, the display visually presenting to the user a second joint option feature;
    responsive to a tenth interaction between the user and the electronic device, the display positioning the second joint option feature within a sub-portion of the third specified portion that overlaps a sub-portion of the first or second specified portion; and
    the display visually presenting a second movement of the digital character based at least in part on the first, second, and third vector cutters and first and second joint option features.

9. The machine-controlled method of claim 8, wherein the display is a touchscreen.

10. The machine-controlled method of claim 9, wherein any or all of the first, third, and seventh interactions between the user and the electronic device comprises the user tapping or double-tapping the display on or near the digital character presented by the display.

11. The machine-controlled method of claim 10, wherein any or all of the first, third, and seventh interactions between the user and the electronic device comprises the user tapping or double-tapping the display on or near the corresponding portion of the digital character.

12. The machine-controlled method of claim 10, wherein any or all of the second, fourth, and seventh interactions between the user and the electronic device comprises the user adjusting the size, shape, or both of the corresponding vector cutter.

13. The machine-controlled method of claim 12, wherein the fifth interaction between the user and the electronic device comprises the user tapping or double-tapping the display on or near the sub-portion of the first specified portion that overlaps the sub-portion of the second specified portion, and wherein the ninth interaction between the user and the electronic device comprises the user tapping or double-tapping the display on or near the sub-portion of the third specified portion that overlaps the sub-portion of the first or second specified portion.

14. The machine-controlled method of claim 1, wherein the digital character is selected from a digital character library.

15. The machine-controlled method of claim 1, further comprising the electronic device recording a plurality of user-directed actions based at least in part on the first and second vector cutters and first joint option feature.

16. The machine-controlled method of claim 15, further comprising the display playing back the recorded plurality of user-directed actions.

17. The machine-controlled method of claim 16, wherein the recorded user-directed actions are played back as applied to another digital character.

18. One or more non-transitory machine-readable storage media configured to store machine-executable instructions that, when executed by a processor, cause the processor to perform the machine-controlled method of claim 1.

19. A handheld electronic device, comprising:
a display configured to visually present to a user a digital character; and
a processor configured to:
responsive to a first interaction between the user and the electronic device, cause the display to visually present to the user a first vector cutter;
responsive to a second interaction between the user and the electronic device, cause the display to position the first vector cutter over a first specified portion of the digital character;
responsive to a third interaction between the user and the electronic device, cause the display to visually present to the user a second vector cutter;
responsive to a fourth interaction between the user and the electronic device, cause the display to position the second vector cutter over a second specified portion of the digital character;
responsive to a fifth interaction between the user and the electronic device, cause the display to visually present to the user a first joint option feature;
responsive to a sixth interaction between the user and the electronic device, cause the display to position the first joint option feature within a sub-portion of the first specified portion that overlaps a sub-portion of the second specified portion; and
cause the display to visually present a first movement of the digital character based at least in part on the first and second vector cutters and first joint option feature.

20. The handheld electronic device of claim 19, further comprising a memory configured to store a recorded plurality of user-directed actions based at least in part on the first and second vector cutters and first joint option feature.

* * * * *